United States Patent [19]

Hara et al.

[11] 4,374,900

[45] * Feb. 22, 1983

[54] COMPOSITE DIAMOND COMPACT FOR A WIRE DRAWING DIE AND A PROCESS FOR THE PRODUCTION OF THE SAME

[75] Inventors: Akio Hara; Shuji Yazu, both of Itami, Japan

[73] Assignee: Sumitomo Electric Industry, Ltd., Osaka, Japan

[*] Notice: The portion of the term of this patent subsequent to Oct. 6, 1998, has been disclaimed.

[21] Appl. No.: 53,204

[22] Filed: Jun. 29, 1979

[30] Foreign Application Priority Data

Jul. 4, 1978 [JP] Japan ................................ 53/80476
Jan. 16, 1979 [JP] Japan ................................ 54/2245

[51] Int. Cl.$^3$ .......................... B22F 7/06; B22F 7/08; C22C 29/00
[52] U.S. Cl. .................... 428/551; 428/565; 428/614; 428/615; 428/627; 428/634; 419/11
[58] Field of Search .............. 428/557, 565, 576, 595, 428/614, 615, 627, 634, 551; 75/203, 208 R

[56] References Cited

U.S. PATENT DOCUMENTS

| | | | |
|---|---|---|---|
| 1,597,928 | 8/1926 | Simons | 428/634 X |
| 2,382,666 | 8/1945 | Rohrig et al. | 428/634 X |
| 2,582,231 | 1/1952 | Catallo | 428/565 X |
| 2,999,309 | 9/1961 | Kuzmick et al. | 428/627 X |
| 3,023,490 | 3/1962 | Dawson | 428/627 X |
| 3,165,822 | 1/1965 | Beeghly | 428/565 X |
| 3,443,343 | 5/1969 | Pratt | 428/627 X |
| 3,826,630 | 7/1974 | Roy | 428/634 |
| 4,139,374 | 2/1979 | Yih et al. | 75/203 X |
| 4,293,618 | 10/1981 | Hara et al. | 428/565 X |

FOREIGN PATENT DOCUMENTS 50-26746 3/1975 Japan .................. 428/565

OTHER PUBLICATIONS

Schwarzkopf et al.: *Cemented Carbides*, The MacMillan Co., New York, 1960, pp. 14, 15 and 38-47.
Planseeberichte fur Pulvermetallurgie, Bd. 20, Nr. 1, Marz 1972, pp. 39-47.
Transactions of the Metallurgical Society of AIME, vol. 233, Apr. 1965, pp. 643-651.
Schwarzkopf et al.: "Cemented Carbides," The MacMillan Company, New York, 1960, pp. 74 and 75.

*Primary Examiner*—Richard D. Lovering
*Attorney, Agent, or Firm*—Wenderoth, Lind & Ponack

[57] ABSTRACT

The present invention relates to a composite diamond compact for a wire drawing die, in which a part or all of the circumference of a diamond sintered body is surrounded by a cermet consisting of a hard compound of (Mo, W)C type carbide crystals containing molybdenum as a predominant component, bonded by an iron group metal, and the binder phase of the diamond sintered body contains an iron group metal and fine carbide crystals containing molybdenum as a predominant component.

29 Claims, 15 Drawing Figures

COMPOSITE DIAMOND COMPACT FOR A WIRE DRAWING DIE AND A PROCESS FOR THE PRODUCTION OF THE SAME

BACKGROUND OF THE INVENTION

1. Field of the Invention

The present invention relates to a wire drawing composite die having excellent properties and a process for the production of the same. More particularly, it is concerned with a wire drawing diamond compact comprising a diamond compact bonded coherently to a cerment containing molybdenum and a process for the production of the same.

2. Description of the Prior Art

As a composite polycrystalline diamond die for wire drawing, there has been proposed such a structure that the circumference of a diamond compact using cobalt as a binder is surrounded by a cemented carbide alloy of WC-Co (Japanese Patent Application (OPI) No. 26746/1975) and this diamond die has been marketed. In a wire drawing die using this diamond compact, a surrounding support consisting of a WC-Co alloy is subjected to grinding and forcibly put in a high strength binding ring, whereby the diamond compact part is pressurized, and this diamond die is more suitable for drawing a wire rod which is hard to break and has a high strength than the prior art single crystal diamond die.

The inventors have traced Examples disclosed in the above described patent publication, but, for all practical purposes, it is considerably difficult to use the WC-Co green compact as disclosed therein. The reason is that it is difficult to take measures to cope with the situation that the WC-Co green compact contains a large quantity of gaseous components because of being finely powdered and it is difficult to hold the shape thereof during hot pressing because of a low strength.

The inventors have made studies on the use of a sintered body of WC-Co alloy as a support for a diamond compact and, consequently, have dissolved the above described two problems. In this case, however, there occurs a new problem that the sintered body of WC-Co alloy tends to be cracked. This is due to that the sintered body of WC-Co is subject to a stress of higher than the strength thereof during hot pressing and since ordinarily, the pressure is firstly raised to a desired pressure followed by raising the temperature, the WC-Co body cannot be adapted to a deformation of a pressed part during raising of the pressure.

When a commercially sold polycrystalline diamond die using a WC-Co alloy as a surrounding support is really used in the field where natural diamond dies are used, it is found that there are various problems. That is, these problems are that the surface of a drawn wire rod is often scratched stripewise, seizure sometimes takes place and the diameter of a wire varies, in particular, when using a soft material, because the drawing force of the former diamond die is larger than that of the natural diamond die.

The above described diamond compact commercially sold for dies is a sintered body of diamond particles of about 60 microns, which contains a binder phase consisting predominantly of cobalt in a proportion of about 10% by volume. The foregoing publication describes that the liquid phase of the eutectic composition of a WC-Co alloy as a support enters diamond particles from the circumference during sintering to thus form a binder phase. When the inside of a die causing troubles is observed, it is found that a drawn material is deposited on the binder phase and the diamond particles partly fall off with the binder phase.

SUMMARY OF THE INVENTION

It is an object of the present invention to provide a diamond compact for a wire drawing die.

It is another object of the present invention to provide a diamond compact for a wire drawing die using a cermet having a large capability of plastic deformation up to breakage as well as a high rigidity at a high temperature.

It is a further object of the present invention to provide a wire drawing die comprising a diamond compact which has a decreased frictional force during wire drawing and less scratches wire rods to be drawn.

It is a still further object of the present invention to provide a process for the production of a diamond compact using a relatively low price (Mo, W)C as a starting material.

It is a still further object of the present invention to provide a process for the production of a diamond compact for a wire drawing die, wherein sintering is carried out at a lowered temperature and under a decreased pressure.

These objects can be achieved by a diamond compact for a wire drawing die, in which the circumference of a diamond compact is surrounded by a cermet consisting of carbide crystals in the form of (Mo, W)C containing molybdenum as a predominant component, bonded by an iron group metal, and a process for the production of a diamond compact for a wire drawing die, which comprises filling a presintered ring-shaped cermet consisting of carbide crystals in the form of (Mo, W)C containing molybdenum as a predominant component, bonded by an iron group metal, with diamond powder, sintering the diamond powder at a temperature and pressure at which diamond is stable and at 1200° C. or higher and 45 kb or higher and thereby bonding the diamond sintered compact coherently to the cermet.

BRIEF DESCRIPTION OF THE DRAWINGS

The accompanying drawings are to illustrate the principle and merits of the present invention in more detail.

FIG. 5—1 is a graph showing the relation of the temperature and hardness.

FIG. 5—2 is a graph showing the relation of the strain and compressive stress.

DETAILED DESCRIPTION OF THE INVENTION

Figure 1:
FIG. 1 is a photograph showing the distribution state of diamond crystals and binder phases during sintering.

In accordance with the present invention, there is provided a diamond sintered body or compact for a wire drawing die, in which a part or all of the circumference of a diamond compact is surrounded by a cermet consisting of carbide crystals in the form of (Mo, W)C containing molybdenum as a predominant component, combined by an iron group metal. In a preferred embodiment, there is provided an alloy with a particularly high strength and large capability of plastic deformation in which the binder phase of a diamond compact contains an iron group metal and fine carbide crystals containing molybdenum as a predominant component.

Furthermore, the present invention provides an improved process for producing a composite diamond compact for a die by the use of, as a surrounding support for a diamond compact, a cermet consisting of carbide crystals in the form of (Mo, W)C containing molybdenum as a predominant component, bonded by an iron group metal, and in particular, it provides a process for the production of a diamond compact for a wire drawing die, which comprises filling a presintered ring-shaped cermet (i.e., a cermet which has been previously sintered) consisting of carbide crystals in the form of (Mo, W)C containing molybdenum as a predominant component, bonded by an iron group metal, with prediamond powder, sintering the diamond powder at a temperature and pressure at which diamond is stable and bonding the diamond sintered body or compact coherently to the cermet.

The carbide crystals represented by the form of (Mo, W)C in the cermet used in the present invention contain molybdenum and tungsten in an Mo to W ratio of at least 1:1 by atomic volume with a binder such as iron, cobalt, nickel or alloy thereof, which are sintered. The quantity of the binder metal in this cermet is determined so as to give a desired rigidity and toughness and it is preferably 5 to 30% by volume based on the cermet. This cermet is sintered at a temperature of about 1200° to 1500° C. in vacuum or in an atmosphere of inert gas or reducing gas. The thus presintered ring-shaped cermet is filled with diamond powder and then subjected to sintering at an ultra-high pressure and high temperature. During the same time, the pressure and temperature are within a range in which diamond is thermodynamically stable. Ordinarily, the hot pressing is carried out at a temperature of about 1200° C. or higher and a pressure of about 45 kbar or higher.

The composition of the cermet suitable for the production of a composite sintered body according to the present invention comprises a hard compound phase of carbides in the form of (Mo, W)C with an Mo to W ratio of at least one by atomic volume and a binder phase of an iron group metal with a ratio of 5 to 30% by volume based on the cermet. If the quantity of the binder phase is less than this range, the strength of the alloy is lacking so that a composite body tends to be cracked during sintering under an ultra-high pressure, while if more than this range, a composite body is too deformed during sintering to hold a desired shape. When using cobalt or nickel or alloys thereof as a binder material for the cermet, it is desirable to add further iron in a proportion of 0.1% by weight or more to the binder material in order to obtain a high strength. If the quantity of iron exceeds 20% by weight, the sintering property and strength of the alloy are lowered.

The carbide of (Mo, W)C type used in the present invention is correctly a mixed or composite carbide of molybdenum and tungsten represented by $(Mo, W)_1C_x$ wherein $0.5 < x \leq 1$, having the same simple hexagonal structure as WC. That is to say, 10% by volume or less of carbide crystals of $M_2C$ type can be incorporated in the carbide crystals of (Mo, W)C type. Preferably, the carbon content in this cermet is controlled within such a range that a good strength property can be given. According to the results of our experiments, it is found that an excellent strength property can be obtained when the carbon content satisfies the relation of $x=0.8$ to 0.98 in $(Mo, W)_1C_x$.

Figure 2:
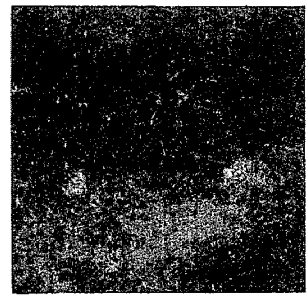
FIG. 2 is a photograph showing the distribution of molybdenum elements in the same view as FIG. 1.
Figure 3:
FIG. 3 is a photograph (magnification: 1500 times) showing the structure of a sintered body according to the present invention.
Figure 4:
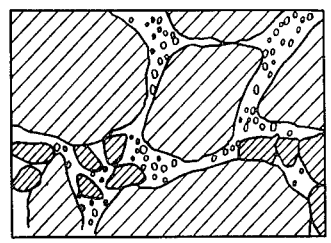
FIG. 4 is a typical view of FIG. 3.

FIG. 1 to FIG. 3 show analysis results of a sintered body according to the present invention using an X-ray microanalyser. FIG. 1 is a microscopic photograph of 1,000 magnifications of a backscattered electron image, showing the distribution state of the diamond crystals and binder phase, in which gray areas are diamond particles and white areas are binder phases. In this binder phase, there are precipitated molybdenum carbide crystals as shown in FIG. 2. This teaches as apparent from the microscopic photograph of FIG. 3 that very fine carbide crystals are dispersed in the binder phase. FIG. 4 is a typical view thereof, in which the shaded areas show diamond particles and the particles finely dispersed in the binder phase of the diamond particles are carbides containing molybdenum as a predominant component. The reason is considered as follows, why the property of a diamond compact as a wire drawing die is improved by the presence of molybdenum carbide in the binder phase. During wire drawing, the inner surface of the die is subject to friction with a wire rod to be worked under a high pressure. Diamond is generally characterized by the property that the coefficient of friction with a workpiece is low in such a case and the adhesion thereof to the workpiece is hard to occur, but the binder phase of the diamond compact meets with a problem of adhesion. Molybdenum carbide, on the other hand, has the property that such a adhesion is hard to occur in comparison with tungsten carbide. The correct reason therefor is not clear, but this is possibly due to the characteristic of an oxide formed on the frictional surface. Molybdenum carbide is oxidized to form $MoO_3$, which is a self-lubricating agent having a laminar structure and the lowest coefficient of friction of various oxides. The self-lubricating property is based on the fact that the oxide has a melting point of 795° C. and tends to form readily a lubricating film on the frictional surface exposed to a high pressure and high temperature. On the contrary, the oxide formed by the oxidation of tungsten carbide, showing a higher coefficient of friction and a high melting point, i.e. 1473° C., does not have such a lubricating effect.

In the present invention, in order to obtain a diamond compact for a wire drawing die in which molybdenum carbide is finely precipitated in the binder phase, it is preferable to employ a method comprising bringing diamond powder and a cermet consisting of a carbide of (Mo, W)C type bonded by an iron group metal such as cobalt, nickel or an alloy thereof containing a small amount of iron into contact with each other, subjecting to a super-high pressure and high temperature at which diamond is stable to form a liquid phase in the cermet and impregnating the diamond powder with the liquid phase.

Thus, the diamond powder is impregnated with the liquid phase having an eutectic composition of molybdenum carbide and an iron group metal whereby diamond particles are bonded through the liquid phase and molybdenum carbide is crystallized in the binder phase. In cermets consisting of carbides of (Mo, W)C type bonded by iron-free iron group metals such as cobalt and nickel, coarse needle shaped carbides having another crystal structure of (Mo, W)$_2$C or Mo$_2$C are precipitated when the carbon content in the carbides is lacking. In the case of using as a binder cobalt, nickel or alloys thereof, to which a very small amount of iron is added, there is obtained an alloy having a high strength and large capability of plastic deformation, in which carbides of (Mo, W)$_2$C or Mo$_2$C are finely dispersed.

For the purpose of dispersing finely carbides of (Mo, W)C or Mo$_2$C type in the alloy, addition of other impurity elements than iron to the biner metal is also effective. As the impurity elements there can be used beryllium, calcium, magnesium, silicon, phosphorus, manganese and rhenium, but these elements should be added in a proportion of 3% by weight or less based on the quantity of the binder metal since if more than this range, the binder phase is too deteriorated to give a sufficiently high strength. The particle growth retarding effect of carbides of Mo$_2$C type is also found by incorporating titanium, zirconium, hafnium, tantalum or niobium besides the above described impurity elements. These elements are dissolved in carbides of (Mo, W)C and Mo$_2$C and partly dissolved in the binder metal phase. As another method for dispersing finely carbides of Mo$_2$C type, it is also effective to use a binder metal consisting mainly of nickel. For example, the use of a binder metal consisting of 50 to 100% by weight of nickel and 50 to 0% by weight of cobalt is effective for retarding the particle growth of Mo$_2$C.

In addition to the above described methods, rapid cooling of an (Mo, W)C base cermet from the sintering temperature is effective for retarding the grain growth of carbides of Mo$_2$C type. Since presintering of an (Mo, W)C base cermet used in the present invention is ordinarily carried out in a vacuum furnace, the cermet can rapidly be cooled after sintered by a known method, for example, by introducing a cooling gas such as nitrogen or argon gas into the furnace and optionally, circulating forcedly the cooling gas by means of a fan.

In the case of presintering an (Mo, W)C base alloy used in the present invention, the sintering temperature has an upper limit. A suitable sintering temperature depends upon the composition of a cermet and the carbon content, but, if the sintering is carried out at a temperature of above 1450° C., carbides Mo$_2$C type tend to be coarsened.

The feature of the cermet used in the present invention is that the liquid phase formed when it is filled with diamond powder and heated under a super-high pressure shows compositions varying with the heating temperature. At a relatively low temperature, there is formed an eutectic melt consisting of molybdenum, carbon and an iron group metal such as cobalt, iron or nickel as a binder material, and if the heating temperature is increased, there is formed an eutectic melt consisting of tungsten, carbon and an iron group metal. This corresponds to the fact that the eutectic temperature of molybdenum, carbon and nickel, for example, is about 1200° C. under normal pressure while the eutectic temperature of tungsten, carbon and nickel is above 1300° C. Therefore, the liquid phase entering the diamond sintered body part according to the present invention has selectively a high molybdenum content and a carbide consisting mainly of molybdenum is precipitated in the binder phase.

The diamond sintered part in the composite compact of the present invention has a diamond content of 70% or more by volume, the balance being a binder phase comprising an iron group metal and carbide consisting mainly of molybdenum. The size of diamond crystal particles in the diamond sintered part ranges from fine particles of 1 micron or less to maximum 500 microns, but a sintered body of fine particles of 10 microns or less is most preferable. In order to obtain such a diamond sintered body or compact of fine particles, it is necessary to use diamond fine powder of 10 microns or less as a starting material. In the case of sintering a diamond powder of fine particles under a super-high pressure, in particular, the property of a receptacle to be filled therewith is a problem. In general, it is difficult to make a compact of a high hardness and less deformable powder such as diamond powder at room temperature and in the case of a fine powder, in particular, a packing density of at most about 60% is only obtained even if it is packed under pressure. When a composite compact of the present invention is prepared by filling the hole of a presintered cermet with diamond powder and sintering with pressing and heating under a super-high pressure, the cermet to be a receptacle should be deformed and shrinked to transmit a pressure to the diamond powder. Even when such a deformation is produced, the cermet should not be broken. When using a WC-Co alloy of the prior art for the receptacle, it is capable of following such a deformation if having a high cobalt content, but in this case, the quantity of cobalt transferred to the diamond sintered part is large to give a diamond compact with a large quantity of the binder phase. This is not preferable. The cermet consisting predominantly of a carbide of (Mo, W)C type used in the present invention has a much larger capability of plastic deformation as compared with a WC-Co alloy having the same binder metal volume and thus is particularly suitable for the production of the fine particle diamond compact.

Figures 1, 5:
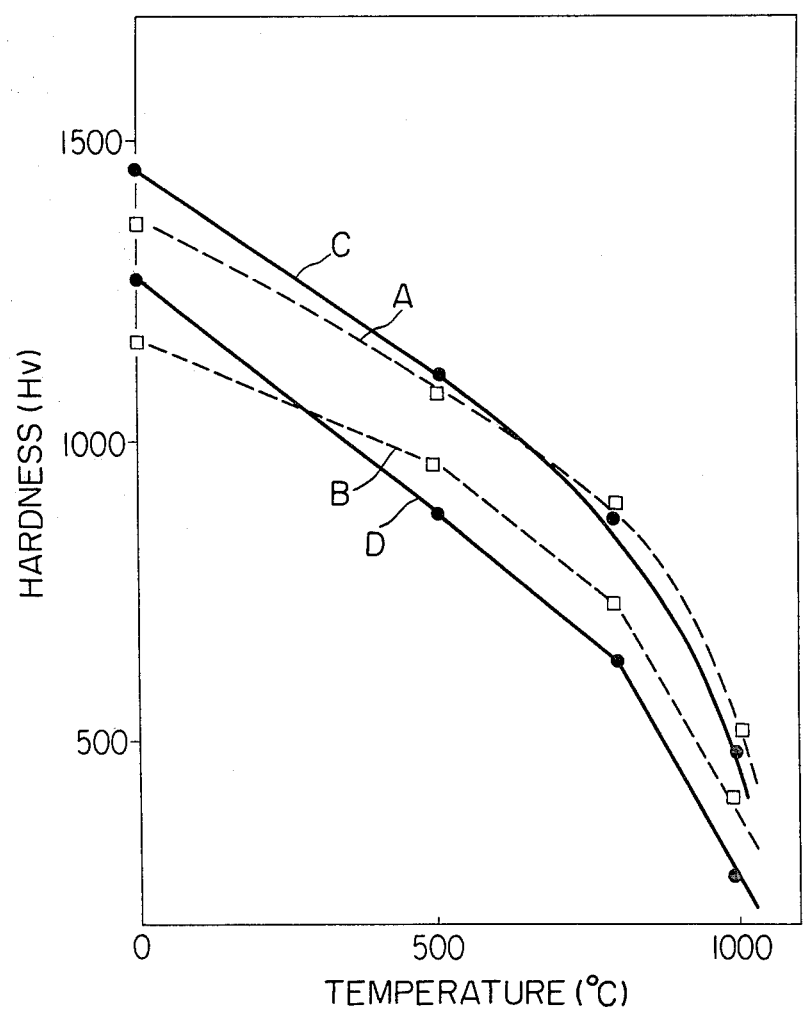
Figures 2, 5:
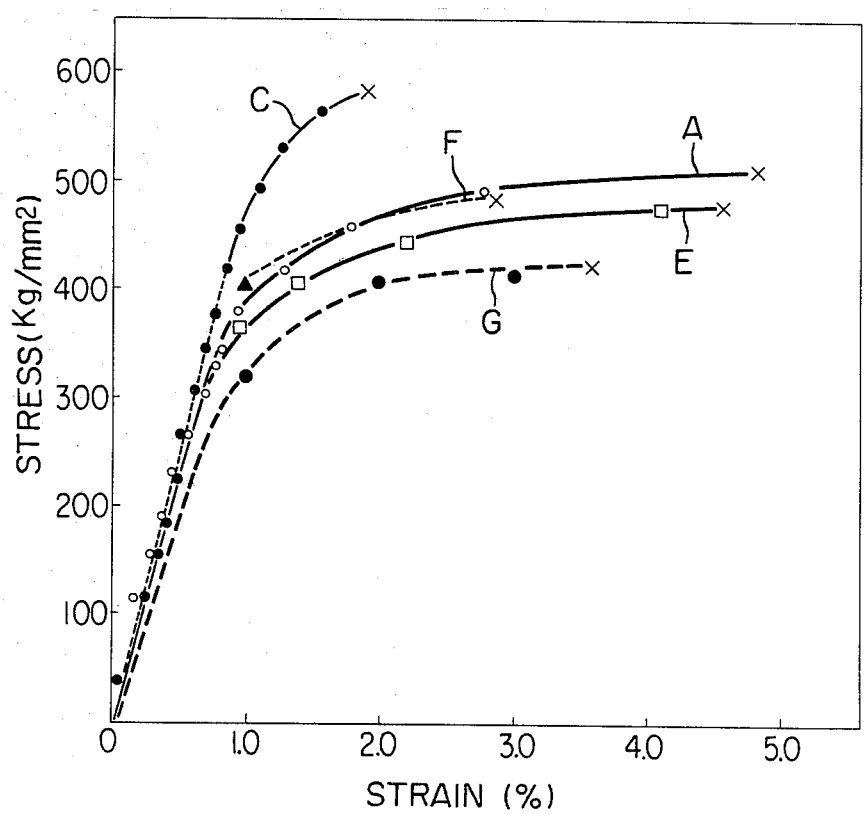

As shown in FIG. 5-1, (Mo, W)C base cermets (A: (Mo$_7$W$_3$)C—11 vol % Co; B: (Mo$_7$W$_3$)—15.3 vol % Co) have a lower hardness at a low temperature and a higher hardness at a high temperature than WC base cermets (C: WC—11 vol % Co; D: WC—15.3 vol % Co). FIG. 5-2 also compares (Mo, W)C base cermets and WC-Co alloys with respect to the compressive deformation characteristic, in which A: (Mo$_7$W$_3$)C—11 vol % Co; E: (Mo$_5$W$_5$)C—19 vol % Co; C: WC—11 vol % Co; F: WC—16 vol % Co; and G: WC—24 vol % Co and mark x shows a broken point. In comparison of the alloys A and C having the same volume percent of the binder metal phase, the former shows a much larger quantity of strain to breakage. The alloy A has a large quantity of strain than the alloy G having a larger volume percent of cobalt. As evident from these data, the (Mo, W)C base cermet, even if the quantity of the binder phase is small, is hard to break when a composite compact is sintered under a super-high pressure and a fine particle diamond compact with a low binder metal content can be obtained by the use of such a cermet.

A process for the production of a cmposite sintered body or compact according to the present invention is particularly characterized in that the temperature and pressure conditions are largely moderated in the sintering under a super-high pressure.

Figure 6:
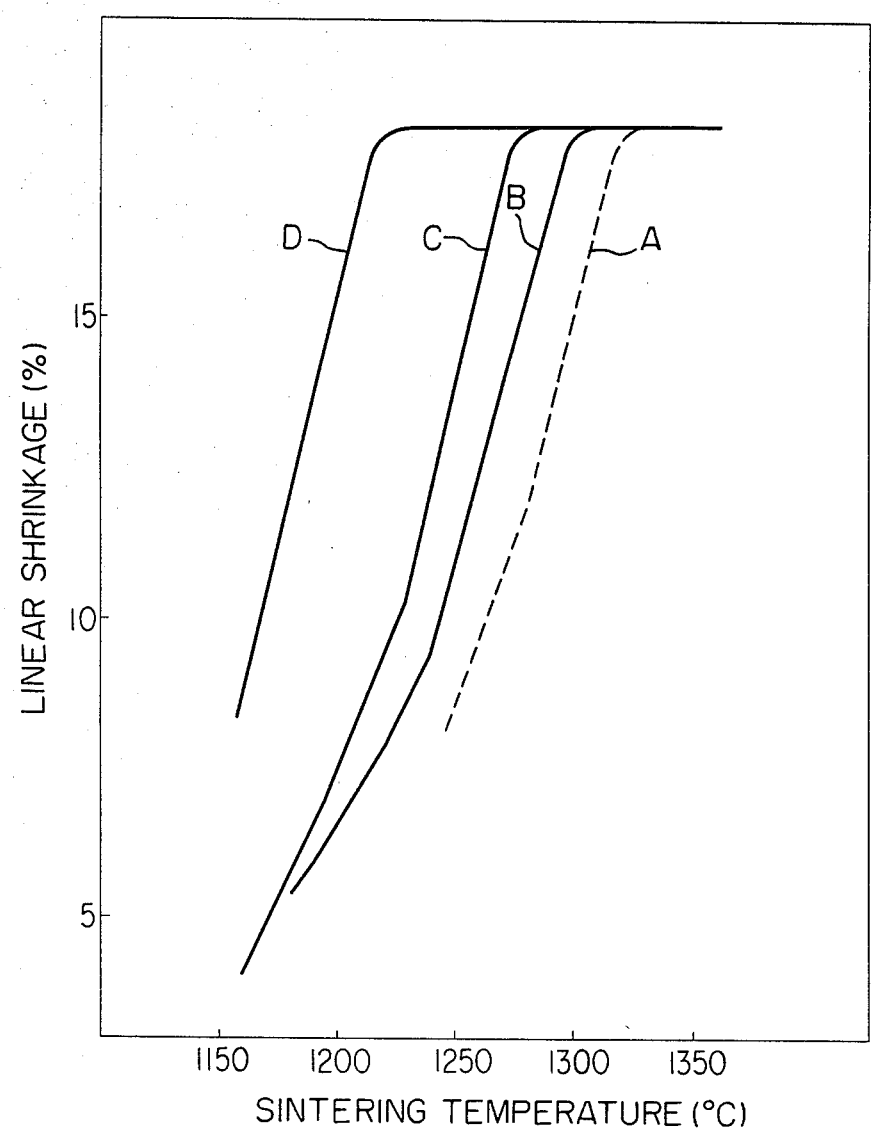
FIG. 6 is a graph showing the relation of the sintering temperature and linear shrinkage as to various cermets of (Mo, W)C.

That is to say, in this (Mo, W)C base cermet, the minimum sintering temperature is lowered with the increase of the proportion of molybdenum to tungsten. FIG. 6 shows sintering shrinkage curves of various (Mo, W)C base cermets A, B, C and D comprising respectively a carbide of WC, $(Mo_5W_5)C$, $(Mo_7W_3)$ or $(Mo_9W_1)C$ combined with 20% by weight of a Co+Ni (1:1) alloy. In the case of the alloy D of $(Mo_9W_1)C$, shrinkage is already finished at 1225° C. that is 100° C. lower than in the case of the alloy A of WC, i.e. 1325° C. or higher.

Figure 7:
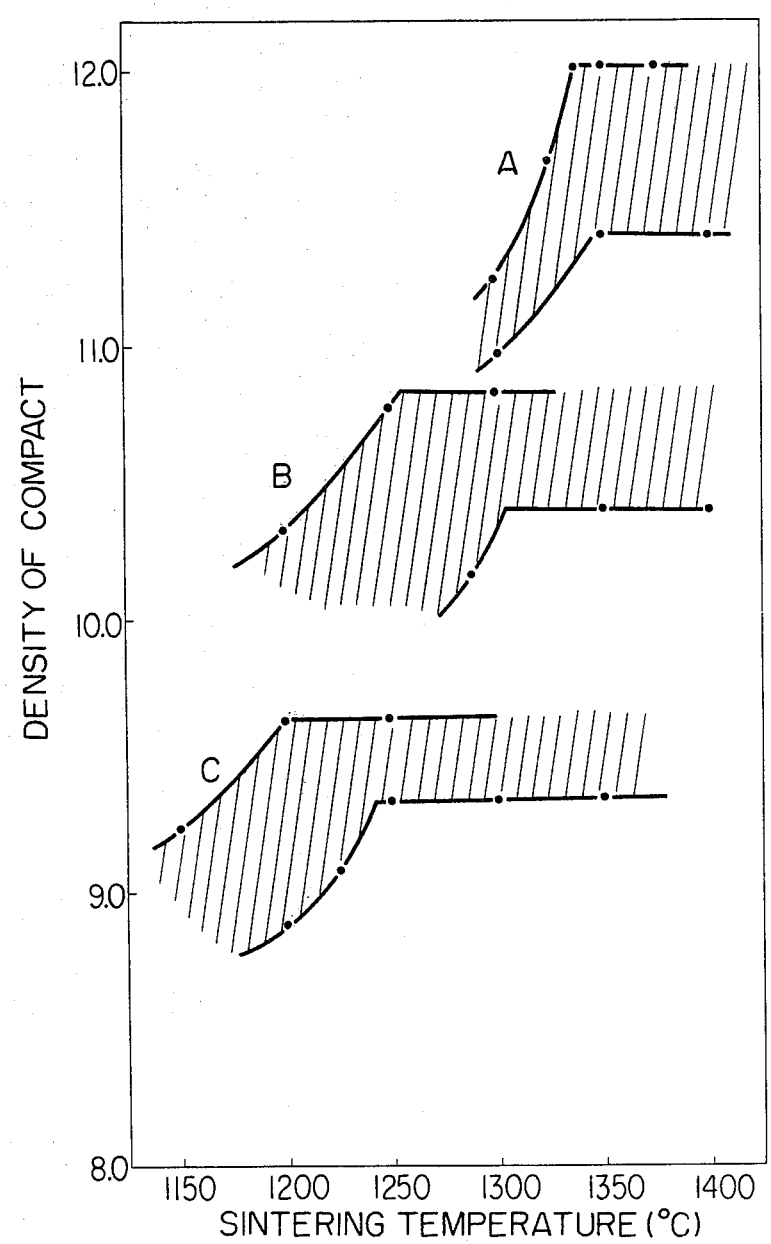
FIG. 7 is a graph showing the relation of the sintering temperature and compact density as to various cermets of (Mo, W)C.

FIG. 7 shows the relation of the sintering temperature in the ordinary vacuum sintering of (Mo, W)C base cermets used for the composite compact according to the present invention with the densities of the resulting sintered bodies, in which A: $(Mo_5W_5)C$—10 wt % Co—10 wt % Ni alloy, B: $(Mo_7W_3)C$—10 wt % Co—10 wt % Ni alloy and C: $(Mo_9W_1)C$—10 wt % Co—10% Ni. The each shaded portion shows that the sintering temperature and the density of the sintered body are varied with the carbon content in the alloy. In this graph, the curve under the shaded portion shows a high carbon alloy corresponding to x=0 where the combined carbon content in the alloy is represented by the form of $(Mo, W)_1C_{1-x}$ and the curve above the shaded portion shows a low carbon alloy corresponding to x=0.4. As evident from this figure, the (Mo, W)C base cermet shows a lowered sintering temperature with the increase of the molybdenum content in the carbide. This is due to that the eutectic point of Mo-C-Co (Ni) is lower than that of W-C-Co (Ni) and the melts of these eutectic compositions enter the sintered diamond part to give a binder phase with a molybdenum rich composition. In this experimental range, sintering proceeds well at a low temperature with the decrease of the carbon content. It is to be noted herein that the $(Mo_9W_1)C$ base alloy C is completely sintered at 1200° C. In the case of cemented carbide allows of WC-Co having a liquid phase giving temperature of about 1300° C., there is obtained no complete sintered body unless sintering is carried out at a temperature above about 1300° C.

Since a coolant is generally used in a case where the diamond compact is used for a wire drawing die and thus the temperature rising of the die is at most several hundreds degrees centigrade, it is out of the question that the sintering temperature is low as set forth above, that is, the high temperature strength is low at higher than 1000° C.

Figure 8:
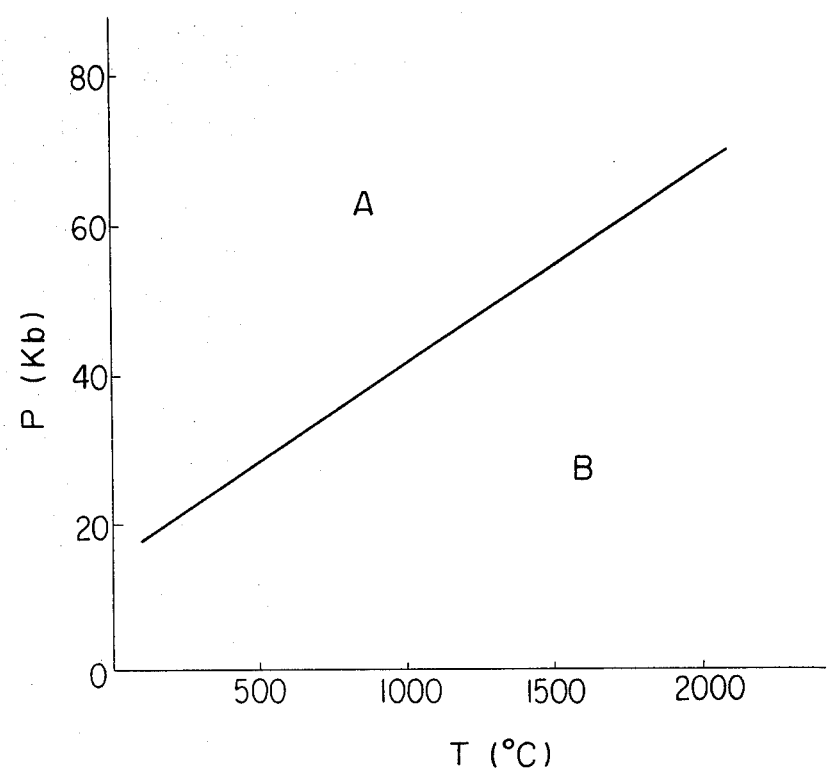
FIG. 8 is a graph showing the stable zones of diamond and graphite.

In the production of a sintered diamond for a wire drawing die according to the present invention, it is significant on a commercial scale that the temperature required for sintering is low. FIG. 8 shows the stable zones of diamond A and graphite B. For the production of a sintered diamond compact, it is necessary to effect sintering in the diamond stable zone A. The inclination of this equilibrium line is approximately 3 kbar/100° C., so lowering of the necessary sintering temperature by 100° C. leads to lowering of the necessary pressure by 3 kbar. Since, as well known in the art, the life of a super-high pressure apparatus varies exponentially with the necessary pressure and temperature at about 50 kbar, the above described moderation of the operation conditions means that the life of a super-high pressure apparatus can be lengthened by several ten times or more.

In the case of sintering a diamond powder with a particle size of 10 microns or less according to the present invention, an abnormal particle growth tends to occur during sintering, but this particle growth of diamond can be retarded by lowering the sintering temperature. Therefore, it is advantageous from this point of view that the sintering temperature can be lowered by about 100° C. according to the present invention.

In another embodiment of the present invention, for the production of the composite compact of the invention, a presintered ring-shaped (Mo, W)C base cermet is filled with a mixture of diamond powder with one or more of molybdenum powder, $Mo_2C$ powder and WC powder in a suitable amount capable of forming carbides of (Mo, W)C or carbides containing molybdenum as a predominant component, followed by sintering. Preferably, these materials are added in a proportion of 1 to 30% by volume to the diamond powder. In addition, an iron group metal fine powder can be added to the above described mixed diamond powder, preferably, in a proportion of 0 to 15% by volume to the mixed diamond powder. According to this method, it is possible to obtain the advantage that the composition of the binder phase of the diamond sintered part can be controlled independently upon the cermet support. In particular, in the case of using a mixed powder of diamond powder with a powdered iron group metal and a powdered material capable of forming a carbide containing molybdenum as a predominant component in a diamond sintered body forming part, it is not necessary to impregnate the mixed powder with a liquid phase from the surrounding (Mo, W)C base cermet during sintering. Rather, in order to keep constant the composition of the binder phase of the diamond sintered part, it is preferable to provide a partition to prevent the liquid phase formed during sintering from transferring between the cermet part and the mixed diamond powder. As this partition, there can be used such materials as being not fused during sintering at a super-high pressure and high temperature. For example, high melting point metals such as titanium, zirconium, hafnium, tantalum, niobium, chromium, molybdenum, tungsten, platinum, etc, or high melting point compounds such as titanium nitride, zirconium nitride, hafnium nitride, etc. can be favourably used. If this partitioning material is too thick, the similar strength property to that of the (Mo, W)C base cermet is required as a supporting member of the diamond sintered part, and, therefore, the partition is preferably thin, that is, a layer with a thickness of at most 0.5 mm. The partition can be provided, for example, by applying a metallic foil to the inside of a sintered (Mo, W)C base cermet or by plating or vapor depositing a partitioning material thereon. In the case of titanium nitride, zirconium nitride or hafnium nitride, the inside of the cermet can be coated therewith by a known technique such as CVD (chemical vapor deposition) method. In any case, after sintering, the diamond sintered part and (Mo, W)C base cermet are coherently bonded through such a thin partition.

When diamond powder only is filled according to the present invention, the liquid phase enters the diamond part from the cermet part during sintering and the composition of the binder phase of the diamond sintered part is similar to the eutectic composition of the cermet at the pressure and temperature during sintering. In this embodiment of the present invention, on the other hand, the amounts of carbide forming elements such as molybdenum, tungsten, etc. in the binder phase can be increased more than in the above eutectic composition, in other words, the amount of an iron group metal can be decreased. The other important advantage of this method is that a diamond sintered body consisting of super-fine particle diamond crystals of 1 micron or less can readily be obtained. It is found according to our experiment, in which only diamond powders differing in particle size are filled in a ring of a (Mo, W)C base cermet or WC-Co cemented carbide alloy and sintered, that in the case of using a diamond powder of less than 3 microns, in particular, less than 1 micron, an abnormal particle growth of the diamond crystals exceeding 500 microns takes place and, consequently, a diamond sintered body consisting of super-fine diamond crystals of 1 micron or less cannot be produced. On the contrary, in a case where a diamond powder of 1 micron or less is previously mixed with a carbide fine powder of $Mo_2C$, (Mo, W)C, WC, etc. and the resulting mixture is used, an abnormal particle growth of the diamond crystals can surprisingly be retarded. In this case, an iron group metal can further be added to the mixture. In any case, it is preferable that the additive amounts of molybdenum and tungsten are larger than those of the eutectic composition formed in the diamond sintered part during sintering. When the super-fine particle diamond compact obtained by this method is used for a wire drawing, a beautiful wire drawing work surface is given as in the case of using a natural diamond single crystal die. As the carbide to be added to diamond powder in this case, molybdenum carbide or tungsten carbide is preferable, but titanium carbide, zirconium carbide, hafnium carbide, vanadium carbide, niobium carbide, tantalum carbide, chromium carbide, etc. can also be used for the replacement of a part of the former carbide.

Furthermore, (Mo, W)C used in the present invention has a lower density than WC and molybdenum is cheaper in the price as raw material than tungsten so that (Mo, W)C is half the price of WC for the same volume. This is one advantage of this invention in view of that the price of tunsten has suddenly risen of late.

The foregoing disadvantages of the cemented compact of diamond crystals of about 60 microns surrounded by a WC-Co alloy, which has been commercially sold, can be overcome by the composite compact of diamond particles of 10 microns or less according to the present invention. When using the diamond compact of the present invention as a wire drawing die, adhesion thereof to a wire rod to be worked is hard to occur and the diameter of the wire is hardly deformed because molybdenum carbide is finely precipitated in the binder phase and the frictional force of the die is lowered during wire drawing. Furthermore, a wire rod to be worked is hardly scratched by breakage or falling off of diamond crystals because of small particle sizes thereof.

Figure 9:
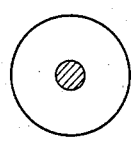
FIG. 9, FIG. 10 and FIG. 11 are embodiments of the composite sintered body according to the present invention.
Figure 10:
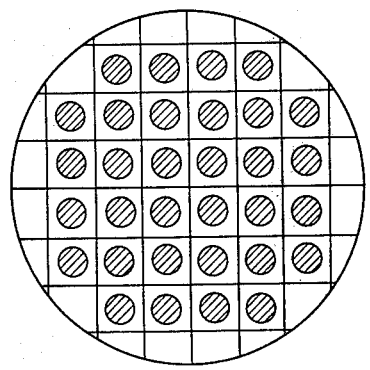
Figure 11:
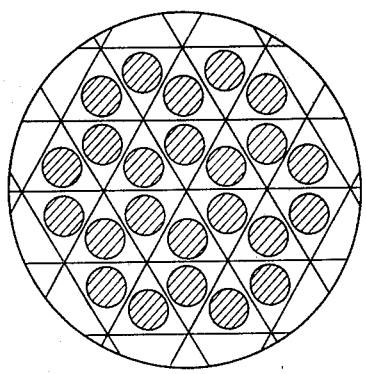

The structure of the composite compact of the present invention is, for example, such that a diamond sintered part is positioned at the center of a cermet consisting mainly of molybdenum carbide and surrounded by the cermet, as shown in FIG. 9. In this case, a die is prepared by fixing this composite compact to the central part of a supporting ring of, for example, stainless steel by the brazing method or powder sintering method using silver alloys, copper alloys, nickel alloys, etc., or by mounting it to a supporting ring by well-known techniques in diamond dies or cemented carbide dies, for example, by adapting forcibly and shrinkage-fitting. In the composite compact of this type, the circumference of the diamond sintered part is surrounded by a cermet with a high rigidity and high strength so that the diamond sintered part is markedly resistant to cracking when used as a die. However, this structure is not always suitable for working a relatively soft wire rod having a diameter of about 2 mm or less, which has usually been worked by the use of a natural diamond die. For such a small sized die, the composite compact of the present invention having the structure as shown in FIG. 10 or FIG. 11 is suitable. In the case of preparing composite compacts using a super-high pressure apparatus, in general, a disk-shaped cermet as shown in FIG. 10 or FIG. 11 is preferably used, in which a plurality of holes are made, and filled with diamond powder, followed by sintering. According to this method, a number of composite compacts can be obtained by sintering only once and the cermet part can readily be cut as shown by straight lines using a diamond cutter. The composite compact as shown in FIG. 10 or FIG. 11 is fixed to a supporting ring of, for example, stainless steel by the powder sintering method or brazing method to prepare a die. The shape of the cermet part of the composite compact after cutting is not limited to a triangle or square, but can optionally be chosen. In summary, the cermet part is only subjected to cutting since the diamond sintered part is hardly cut.

A super-high pressure apparatus used for the production of the sintered body according to the present invention is that of belt type or girdle type. A (Mo, W)C base cermet filled with diamond powder is charged in this super-high pressure apparatus and heated by a heating element of, for example, graphite using pyrophyllite as a pressure medium. The sintering should be carried out at least a temperature where the eutectic liquid phase of the cermet is formed in the diamond stable region and at about 1200° C. or higher under a pressure of about 45 kbar or higher for 5 minutes or more.

The present invention will be illustrated in detail by the following examples without limiting the same, in which percents are to be taken as those by weight unless otherwise indicated.

EXAMPLE 1

A sintered body of 8 mm in outer diameter, 2 mm in inner diameter and 4 mm in height was made of $(Mo_7W_3)C$—11 vol % Co alloy, filled with diamond powder of 100 to 200 mesh and covered with thin sheets of the cermet consisting of the same composition as the sintered body at the upper and lower parts. This assembly was charged in a super-high pressure and high temperature apparatus used for the synthesis of diamond. The pressure was firstly raised to 55 kbar and then the temperature was raised to 1400° C. by passing electric current. The sample was held under this condition for 10 minutes. After lowering the temperature and pressure, the sample was withdrawn, which showed a high dimensional precision and good appearance. The diamond part was impregnated with a Co alloy containing Mo, W and C corresponding to the liquid phase components at 1400° C. from the (Mo, W)C—Co alloy, the Co alloy acting as a binder material, and simultaneously, bonded coherently to the outside (Mo, W)C—Co alloy completely.

A hole was made in a part of the sintered body by laser working to prepare a wire drawing die for a wire of 0.5 mm in diameter. The inner surface was finished by lapping to give a defect free and beautiful surface.

The similar procedure was repeated using WC—11 vol % Co alloy (7 wt % Co) corresponding to the (Mo$_7$W$_3$)C—11 vol % Co alloy and, after hot pressing, the sample was withdrawn. Several cracks were found in the outer cemented carbide part and thus the sample was not put to practical use.

EXAMPLE 2

Figure 12:
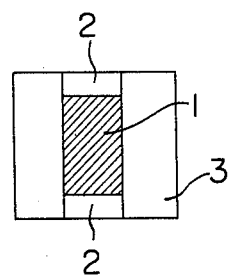
FIG. 12 is a sample assembly before sintering.

A sintered body 3 having a cylindrical form of 14 mm in outer diameter, 5 mm in inner diameter and 12 mm in height were made of (Mo$_5$W$_5$)C—11 vol % Co alloy, filled with diamond particles 1 having a particle size of 325 to 400 mesh and plugged 2 with the same sintered alloy of 3 mm in outer diameter and 1.9 mm in thickness to thus obtain an assembly as shown in FIG. 12. This assembly was charged in a graphite heater, the gap between the heater and assembly being filled with a sintered body of hexagonal BN, and then subjected to sintering under the same conditions using the same super-high pressure apparatus as in Example 1.

For comparison, the similar sintering procedure was repeated except using WC—11 vol % Co with the same form.

Figure 13:
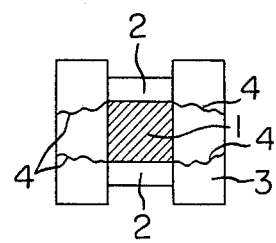
FIG. 13 is the sample assembly of FIG. 12 after sintered under an ultra-high pressure.

Both the samples showed that the diamond sintered parts shrinked by about 40% in the thickness direction in comparison with those before sintered, as shown in FIG. 13. In the sample of the present invention using (Mo$_5$W$_5$)C—11 vol % Co alloy, there was found no crack and the diamond sintered part with a thickness of about 5 mm was bonded completely to the surrounding (Mo, W)C—Co alloy, while in the sample of the prior art using WC—11 vol % Co, lateral cracks 4 were found as shown in FIG. 13.

As in this example, the diamond powder filled part shrinks during sintering and, therefore, the surrounding support should follow the shrinkage. In addition, a super-high pressure added from the surrounding produces a large stress in an assembly of materials differing in compressibility, so a material having a small capability of plastic deformation tends to be cracked.

EXAMPLE 3

A sintered body having a cylindrical form of 8 mm in outer diameter and 6 mm in thickness and having a hole of 3 mm in diameter and 4 mm in depth at the central part was made of (Mo$_7$W$_3$)C—10 vol %—5 vol % Ni alloy, filled diamond powder with a grain size of 230 to 270 mesh and plugged at the upper part with a molybdenum piece with an outer diameter of 5 mm. This assembly was charged in a super-high pressure apparatus and sintered under the same conditions as in Example 1. In the resulting sintered body, there was found no crack and the diamond sintered part with a diameter of about 3 mm and a thickness of about 2 mm was completely bonded to the (Mo, W)C—Co, Ni alloy. The (Mo, W)C—Co, Ni alloy at the upper part and lower part was removed by grinding and a hole of 0.6 mm in diameter was made therein to obtain a die. When this die was subjected to a wire drawing test of tungsten wire, the wire drawing was possible up to a drawn amount of 2.5 tons. In the case of using a die made of natural diamond single crystal according to the prior art, a drawn amount was only about 1.3 tons and the die was often cracked at the initial stage, while a die using the sintered body of the present invention could repeatedly be used by repolishing without such troubles.

EXAMPLE 4

A sintered body having a cylindrical form of 8 mm in outer diameter, 2 mm in inner diameter and 4 mm in height was made of (Mo$_9$W$_1$)C—10 vol % Co—5 vol % Ni alloy, filled with diamond powder with a particle size of 325 to 400 mesh and covered with thin sheets of the cermet having the same composition as the above described alloy at the upper part and lower part. This assembly was charged in the same apparatus as used in Example 1, after which the pressure was raised to 52 kbar and the temperature was raised to 1250° C. by passing electric current, and held under these conditions for 10 minutes. After lowering the temperature and pressure, the sample was withdrawn which had a good appearance as well as an excellent dimensional precision. The resulting sintered body was subjected to laser working to make a hole and a wire drawing die for a wire diameter of 0.175 mm was prepared. When this die was used for drawing a steel cord for a radial tyre, the wire drawing was possible up to a drawn amount of 2.2 tons, which was superior to the prior art die.

EXAMPLE 5

This example is to show the difference in merits or effects between the prior art using a cemented carbide alloy of WC-Co type as a supporting member of a diamond sintered part and the present invention using a sintered body consisting of a (Mo, W)C base cermet bonded by a binder metal containing Co and Ni as predominant components with a small amount of Fe.

A carbide with a composition of (Mo$_9$W$_1$)$_1$C$_{0.9}$ was mixed with Co and Ni and a small amount of Fe and an alloy with a composition of (Mo$_9$W$_1$)C 10% Co—10% Ni—0.5% Fe was prepared. This alloy was sintered at 1250° C. in vacuum and a sintered body was prepared having a cylindrical form of 13 mm in outer diameter and 8 mm in height and having a hole of 4 mm in diameter and 6 mm in depth at the central portion. On the other hand, another sintered body having the same shape was prepared from WC—15% Co alloy for comparison.

Each of these sintered bodies was filled with diamond fine powder with a particle size of 3 microns, covered with a sheet of 4 mm in diameter, made of the same alloy as described above, and charged in a super-high pressure and high temperature apparatus used for the synthesis of diamond, after which the pressure was firstly raised to a predetermined value and the temperature was then raised to thus effect sintering.

Figure 14:
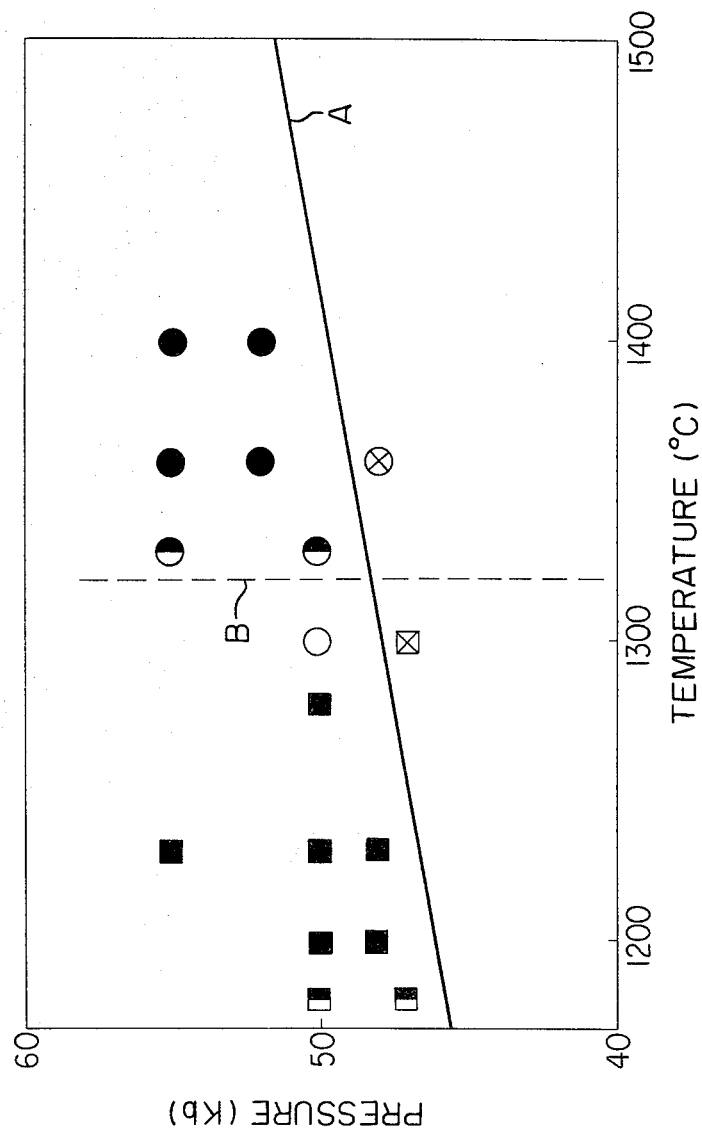
FIG. 14 is a graph showing the effect of the composite sintered body according to the present invention in comparison with the prior art.

The pressures and temperatures employed are shown in FIG. 14, in which marks ▨, ▣ and ⊠ show results in the case of using the (Mo$_9$W$_1$)C base cermet according to the present invention and marks ●, ◐ and ⊗ show results in the case of the WC-Co alloy for comparison. In each case, the sintering time was 20 minutes after the temperature reached a predetermined value. In this graph, A shows the equilibrium line of graphite—diamond and B shows the eutectic point of Co-C. Marks ● and ▨ show a case where a complete composite sintered body was obtained, marks ◐ and ▣ show a case where the diamond sintered part was not a complete compact sintered body and the quantity of impregnation of the liquid binder phase from the surrounding (Mo, W)C cermet or WC-Co alloy was lacking and marks ⊗ and ⊠ show a case where a part of the diamond powder was graphitized. As evident from this graph, the composite sintered body using the $(Mo_9W_1)C$ base cermet according to the present invention gave a complete sintered state at a temperature of 1200° C. under a pressure of 48 kbar, while on the contrary, a complete sintered body was obtained at a temperature of 1360° C. under a pressure of 52 kbar in the case of using the WC-Co alloy.

It is very significant on a commercial scale that the composite sintered body or compact of the present invention can be obtained under moderate conditions of pressure and temperature.

Figure 15:
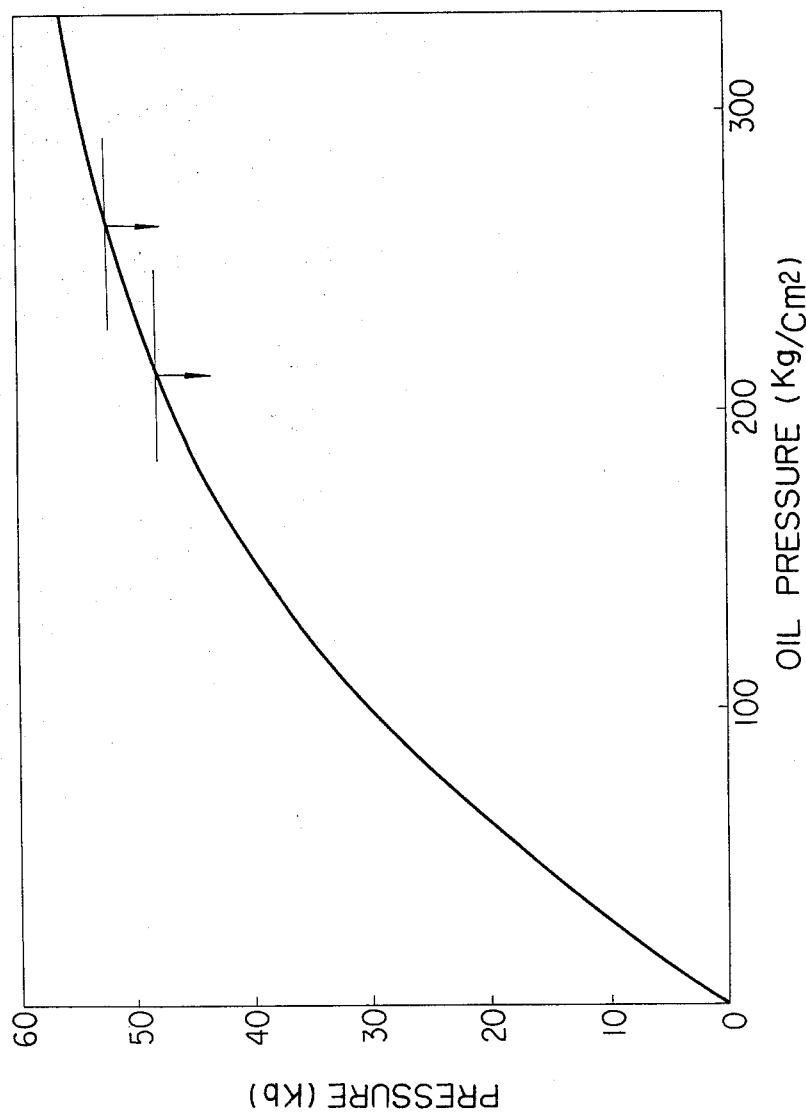
FIG. 15 is a graph showing the relation of the oil pressure and generated internal pressure in an ultra-high pressure apparatus used in the present invention.

FIG. 15 shows the relation of the inner pressure generated in a super-high pressure apparatus of girdle type with the oil pressure of the press therefor. In a super-high pressure apparatus, in general, the relation of the inner pressure generated and load added to the super-high pressure generating section is not linear, but the gradient is rather gentle with the increase of the pressure. Therefore, the decreasing degree of a necessary load added to the apparatus is large even if the lowering of a necessary inner pressure is small. This leads to a large difference in durability of a super-high pressure apparatus.

In the case of the apparatus used in this experiment, the minimum oil pressure required for generating a pressure of 52 kbar was 260 kg/cm² to obtain the composite sintered body using the cemented carbide alloy of WC-Co, but in the case of using the $(Mo_9W_1)C$ base cermet of the present invention, an oil pressure required for generating an inner pressure of 48 kbar was 210 kg/cm². That is to say, the load added to the apparatus is saved by 80%. In addition, the heating temperature was further lowered from 1360° C. to 1200° C., which affected largely the life of the super-high pressure apparatus. When the sintering was carried out at an inner pressure of 48 kbar and a temperature of 1200° C. using the $(Mo_9W_1)C$ base cermet according to the present invention, the number of repeated use amounted to at least three times as many as in the case of using the cemented carbide alloy of WC-Co of the prior art.

EXAMPLE 6

A sintered body of 13 mm in outer diameter, 4 mm in inner diameter and 8 mm in height was made of $(Mo_7W_3)C$—10% Co—0.5% Fe alloy. Observation of the structure of the resulting sintered body through etching with a Murakami solution utilizing that (Mo, W)₂C was etched more readily than (Mo, W)C showed that about 10% by volume of (Mo, W)₂C phase was finely dispersed in the structure, based on the (Mo, W)C phase. This sintered body was filled with diamond powder with a particle size of 200 to 400 mesh and covered with thin sheets of the cermet consisting of the same $(Mo_7W_3)C$ base alloy as described above at the upper part and lower part. The resulting assembly was charged in a super-high pressure and high temperature apparatus used for the synthesis of diamond, after which the pressure was firstly raised to 55 kbar and the temperature was then raised to 1400° C. by passing electric current, and held under these conditions for 10 minutes. After lowering the temperature and pressure, the sample was withdrawn, which showed a good appearance as well as a high dimensional precision. A Co alloy containing Mo, W and C corresponding to the liquid phase components at 1400° C. was impregnated in the diamond part from the (Mo, W)C base alloy to give a binder material and, at the same time, the diamond part was completely bonded to the surrounding (Mo, W)C base alloy. The diamond part of this compact was polished and subjected to analysis using an X-ray microanalyser to examine the binder phase part. FIG. 1 shows the distribution state of diamond crystals and binder phase, FIG. 2 shows the distribution of molybdenum elements in the same view as FIG. 1 and FIG. 3 shows the structure of the sintered body. A hole was made in a part of the sintered body by laser working to prepare a wire drawing die for a wire of 1.2 mm in diameter. The inner surface of the die hole was finished by lapping to give a defect free and beautiful surface.

When this die was subjected to a wire drawing test of a Fe-Ni alloy wire, the wire drawing was possible up to a drawn amount of 600 kg, whilst in the case of a die made of the known WC-Co alloy, the life thereof was exhausted by wire drawing of only 20 kg because of seizure occurred. When using a marketed die made of a diamond compact, wire drawing of 200 kg was possible but some seizure took place.

EXAMPLE 7

A sintered body in the form of a sheet of 25 mm in diameter and 8 mm in height, having 24 holes of 3 mm in diameter and 7 mm in depth, as shown in FIG. 11 was made of $(Mo_7W_3)C$—10% Co—5% Ni—0.5% Fe alloy. Observation of the structure of this sintered body showed that (Mo, W)₂C was granulated and finely dispersed in the structure. These holes were filled with diamond powder with a particle size of 3 microns and plugged using the cermet of the same material. The resulting assembly was charged in a cylindrical heater of graphite, the gap between the heater and sample being filled with a sintered body of hexagonal BN crystals, and subjected to sintering at 53 kbar and 1350° C. for 10 minutes in a super-high pressure apparatus of girdle type. When the sample was taken out of the apparatus, the diamond sintered part shrinked to an outer diameter of about 2.5 mm. 24 diamond compacts were sufficiently sintered and in the cermet part, there was no crack. When a disk having the same holes was made of WC—12% Co alloy containing substantially the same volume percent of the binder material as the above described cermet and a diamond sintered body was similarly prepared therefrom, the WC-Co alloy disk after sintered had a number of cracks penetrating the diamond sintered part and a satisfactory compact could not be given.

The composite compacts of the present invention are separated by cutting the cermet part as shown in FIG. 11 by the use of a diamond cutter. One sample of these compacts was fixed to a supporting ring by hot pressing using a Cu-Sn alloy powder and the diamond sintered part thereof was subjected to laser working to make a hole, thus obtaining a die with a diameter of 0.37 mm. On the other hand, two dies each having the same shape were made using the marketed diamond compact and natural single diamond crystal. For comparison of the capacities, the three dies were subjected to a wire drawing test of a stainless steel at a wire drawing speed of 120 m/min with a mineral oil as a lubricant. In the case of the natural diamond die and marketed diamond compact, the wire lost its lustre at a drawn amount of 20 kg and the life of the die was thus exhausted, while in the case of the diamond compact of the present invention, wire drawing was possible up to a drawn quantity of 65 kg.

EXAMPLE 8

A disk plate having the same shape as that of Example 7 was prepared using a cermet with a composition of $(Mo_5W_5)C$—5% Co—5% Ni—0.5% Fe. 24 holes of 2.0 mm in diameter were made in the disk, in which diamond powder with a particle size of 6 to 9 microns was filled. The resulting assembly was subjected to sintering under the same conditions as in Example 2 to obtain 24 composite sintered bodies. When the structure of the disk of the (Mo, W)C base alloy was observed, there was a small amount of $(Mo, W)_2C$ phase, but after the diamond part was sintered under a super-high pressure, carbon was diffused from the diamond part to the cermet part and there was no $(Mo, W)_2C$ phase round the diamond sintered part.

A die of 0.25 mm in diameter was prepared using this sintered body, while another die with the same diameter was prepared for comparison using the marketed diamond compact. These dies were subjected to a wire drawing test of a plastic coated hard steel wire for a tyre cord at a wire drawing speed of 800 m/min using a lubricant of emulsion type. In the die using the compact of the present invention, wire drawing was possible up to 7 tons, while in the die using the marketed compact, the surface of the wire was largely scratched and the life of the die was exhausted at a drawn quantity of 3 tons.

EXAMPLE 9

Hole-made disks were prepared using WC-Co alloys having Co contents of 15%, 20% and 25% in an analogous manner to Example 7, filled with diamond powder and sintered. After the sintering under a super-high pressure, the samples were withdrawn. In the case of the WC—25% Co alloy, a crack-free sintered body was recovered, but in the case of the WC—15% Co and WC—20% Co alloys, there were found cracks penetrating the diamond sintered parts. When the hardness of the diamond sintered parts was measured as to the diamond compact of Example 2 according to the present invention and the diamond compact using the WC—25% Co alloy, the former had a Vickers hardness of 9,800 measured at a load of 1 kg and the latter had a Vickers hardness of 8,000. This is a difference was considered to be due to the difference of the amounts of metal liquid phases impregnating in the diamond powders from the surrounding alloys as a receptacle.

EXAMPLE 10

A sintered body having a cylindrical form of 8 mm in outer diameter, 2 mm in inner diameter and 4 mm in height was made of $(Mo_9W_1)C$—10 vol % Co—5 vol % Ni—0.5 vol % Fe alloy, filled with diamond powder with a particle size of 2 to 3 microns and covered with thin sheets of the cermet having the same composition as described above at the upper part and lower part. This assembly was charged in the apparatus of Example 1, after which the pressure was firstly raised to 52 kbar and the temperature was then raised to 1250° C. by passing electric current, and held under the same conditions for 10 minutes. After lowering the temperature and pressure, the sample was taken out of the apparatus, which had a good appearance as well as an excellent dimensional precision. A hole was made in this sintered body by laser working to prepare a wire drawing die for a wire of 0.175 mm in diameter. When this die was subjected to wire drawing of a steel cord for a radial tyre, a wire drawing of 5.2 tons was possible up to exhaustion of the die. This result was much better that of the prior art die.

When the structure of the sintered body made of the (Mo, W)C alloy of this example was observed, (Mo, W)$_2$C was granulated and finely dispersed in the structure.

EXAMPLE 11

A similar sintered body to Example 6 was made of $(Mo_9W_1)C$—10 vol % Co—10 vol % Ni—0.5 vol % Fe alloy and filled with diamond powder with a particle size of 1 to 2 microns. This assembly was subjected to sintering by the same procedure and same apparatus as those of Example 1 except adjusting the pressure to 52 kbar, the temperature to 1250° C. and the holding time to 30 minutes. Using the thus obtained sintered body, a similar wire drawing test was carried out to Example 10. A wire drawing of 5.0 tons was possible up to exhaustion of the life of the die. This result was much better than that of the prior art die.

EXAMPLE 12

$(Mo_9W_1)C$—20% Co alloy, $(Mo_9W_1)C$—15% Ni—5% Co alloy and $(Mo_9W_1)C$—20% Ni alloy were prepared using a carbide of $(Mo_9W_1)_1C_{0.9}$, Co powder and Ni powder and sintered at 1350° C. in vaccum. When the structures of these alloys were observed, $(Mo, W)_2C$ was present in the form of needle-shaped coarse crystals in the case of $(Mo_9W_1)$—20% Co alloy, but the latter two alloys, i.e. having a larger nickel content showed such a good structure that $(Mo, W)_2C$ was finely dispersed in the structure. Using these two alloys, diamond sintered bodies were prepared under conditions of a pressure of 52 kbar, a temperature of 1300° C. and a holding time of 10 minutes, which were good sintered bodies having no cracks in the (Mo, W)C alloy part and diamond sintered part.

EXAMPLE 13

A carbide of $(Mo_8W_1Ti_1)C$, Co powder and Ni powder were mixed and sintered to form $(Mo_8W_1Ti_1)$-C—15% Co—5% Ni alloy. A sintered body of this alloy having the same shape as that of Example 5 was filled with diamond fine powder with a particle size of 3 microns and sintered at a pressure of 52 kbar and a temperature of 1350° C. When the diamond sintered part of the resulting sintered body was subjected to elementary analysis using an X-ray microanalyser, it was found that Mo, W and Ti, and Co and Ni were present. When the structure of the (Mo, W, Ti)-C—CO—Ni alloy part was observed, the carbide of $M_2C$ type was granulated and uniformly dispersed in the structure.

EXAMPLE 14

A sintered body having a cylindrical form of 13 mm in outer diameter, 4 mm in inner diameter and 8 mm in height was made of $(Mo_9W_1)C$—10 vol % Co—10 vol % Ni alloy, filled with a mixed powder of 90 vol % of a super-fine particle diamond powder having a particle size of 1 micron or less (mean particle size: 0.3 micron) and 10 vol % of WC powder having a particle size of 1 micron or less, and covered with thin sheets of the same $(Mo_9W_1)C$ base cermet at the upper part and lower part of the cylinder. This assembly was charged in a super-high pressure apparatus and subjected to sintering at a pressure of 52 kbar and a temperature of 1250° C. for 10 minutes. Examination of the sintered body showed that it was composed of super-fine particle diamond crystals of about 0.3 micron, Mo entering from the cermet formed a solid solution with WC to give (Mo, W)C crystals in the binder material and about 7% by volume of Co and Ni entered the diamond sintered part from the cermet. When a die having a hole of 0.36 mm was prepared using this sintered body and subjected to a wire drawing test, a similar wire drawing work surface to the case of using natural diamond single crystal was obtained and the die life amounted to 3 times as long as that of the latter case.

EXAMPLE 15

The inner surface of the same $(Mo_9W_1)C$ base cermet as that of Example 14 was plated with Cr in a thickness of 0.1 mm. Then, the cermet was filled with a mixed powder of 85 vol % of the similar diamond powder of 1 micron or less to that of Example 14, 13 vol % of $(Mo_9W_1)C$ powder and 2 vol % of Co powder, and covered with thin sheets of the same material, the inner surface of which was plated with Cr, at the upper part and lower part. This assembly was charged in a super-high pressure apparatus and subjected to sintering under the same conditions as those of Example 14. Examination of the sintered body showed that the diamond sintered part had the same composition as the starting mixed powder and the sintered body was composed of super-fine particle diamond cyrstals with a particle size of 0.3 micron. At the boundary of the diamond sintered part and $(Mo_9W_1)C$ base cermet, there was a Cr layer consisting of three layers of Cr carbide layers respectively adjacent to the diamond sintered body and cermet and a metallic Cr layer at the intermediate part.

EXAMPLE 16

85 vol % of the similar diamond powder of 1 micron or less to that of Example 14, 8 vol % of $Mo_2C$ powder, 2 vol % of WC powder, 1 vol % of TiC powder and 4 vol % of Co powder were mixed to prepare a mixed powder. The same $(Mo_9W_1)C$ base cermet ring and the same cover as those of Example 14 were all coated with a layer of TiN with a thickness of 15 microns by the CVD method. The CVD method was carried out by bubbling a mixed gas of $H_2$ and $N_2$ in a mixed ratio of 1:1 in a heated liquid of $TiCl_4$ to add about 4% of $TiCl_4$ to the gas and flowing the resulting mixed gas through a furnace in which the gaseous pressure was held at 40 Torr and the inside temperature was held at 800° C. for 8 hours. The thus TiN-coated cermet was filled with the mixed powder of the diamond and sintered under the same conditions as those of Example 14. Examination of the sintered body showed that it was composed of super-fine particle diamond crystals bonded to the $(Mo_9W_1)C$ base cermet through the TiN layer. In the binder phase of the diamond sintered part, there were carbide phases of 1 micron or less of a (Ti, Mo, W)C phase of cubic crystal type and a (Mo, W)C phase of hexagonal type with a metallic Co phase. This sintered body was used in an analogous manner to Example 14. When the sintered body was taken to examine the capacity as a wire drawing die, the similar good results were obtained to those of Example 14.

What is claimed is:

1. A diamond compact in cylindrical form for a wire drawing die, in which a part or all of the circumference of a diamond sintered body is surrounded by a cermet consisting of a hard compound of (Mo, W)C type carbide crystals containing molybdenum as a predominant component, bonded by an iron group metal, and wherein the binder phase of the diamond sintered body contains an iron group metal and fine carbide crystals containing molybdenum as a predominant component.

2. The diamond compact as claimed in claim 1, wherein the hard compound phase contains carbide crystals of (Mo,W)C type containing molybdenum as a predominant component and at most 10% by volume of carbide crystals of $M_2C$ type.

3. The diamond compact as claimed in claim 1, wherein the iron group metal is in a proportion of 5 to 30% by volume based on the whole of the cermet.

4. The diamond compact as claimed in claim 1, wherein the diamond content in the diamond sintered body is at least 70% by volume.

5. The diamond compact as claimed in claim 1, wherein the particle size of the diamond crystals in the diamond sintered body is at most 10 microns.

6. The diamond compact as claimed in claim 1, wherein the iron group metal is selected from the group consisting of cobalt, nickel and alloys thereof and further contains a small amount of iron.

7. The diamond compact as claimed in claim 6, wherein the iron content is in a proportion of 0.1 to 20% by weight.

8. The diamond compact as claimed in claim 1, wherein the carbide crystals of (Mo, W)C type is represented by $(Mo, W)C_x (0.5 \times \leq 1)$.

9. The diamond compact as claimed in claim 8, wherein x is within a range of 0.8 to 0.98 in $(Mo, W)C_x$.

10. The diamond compact as claimed in claim 1, wherein at least one element selected from the group consisting of beryllium, magnesium, calcium, silicon, phosphorus, manganese and rhenium is added to the binder metal in a proportion of 0.1 to 3% by weight.

11. The diamond compact as claimed in claim 1, wherein the hard compound phase contains at least one element selected from the group consisting of titanium, zirconium, hafnium, tantalum and niobium.

12. The diamond compact as claimed in claim 1, wherein the iron group metal contains at least 50% by weight of nickel.

13. The diamond compact as claimed in claim 1, wherein a part or all of the circumference of the cermet has a linear cut surface.

14. A process for the production of a diamond compact for a wire drawing die, which comprises filling a sintered ring-shaped cermet consisting of carbide crystals in the form of (Mo, W)C containing molybdenum as a predominant component, bonded by an iron group metal, with diamond powder, subjecting the diamond powder to high pressure sintering at a temperature and pressure at which diamond is stable and bonding the diamond sintered body coherently to the cermet.

15. The process as claimed in claim 14, wherein the sintered ring-shaped cermet consisting of a hard compound of (Mo, W)C type carbide crystals containing molybdenum as a predominant component, bonded by an iron group metal selected from the group consisting of cobalt, nickel and alloys thereof and further containing iron, has at least one hole, the hole is filled with diamond powder, the diamond powder is subjected to high pressure sintering at a temperature and pressure at which the diamond is stable, and the eutectic composition liquid phase of the cermet is impregnated in the diamond crystal particles while fine carbide crystals containing molybdenum as a predominant component are precipitated in the binder phase of the diamond sintered body.

16. The process as claimed in claim 14, wherein the hard compound phase contains carbide crystals of (Mo, W)C type containing molybdenum as a predominant component and at most 10% by volume of carbide crystals of $M_2C$ type.

17. The process as claimed in claim 14, wherein the diamond powder has a particle size of at most 10 microns.

18. The process as claimed in claim 14, wherein the high pressure sintering of the diamond powder is carried out by firstly subjecting the diamond to pressure and then heating.

19. The process as claimed in claim 14, wherein the high pressure sintering of the diamond powder is carried out at a temperature and pressure at which diamond is stable, and at a temperature of at least 1200° C. and a pressure of at least 45 kbar.

20. The process as claimed in claim 14, wherein the (Mo, W)C base cermet, during the high pressure sintering, is cooled rapidly from the sintering temperature to the liquid phase disappearing temperature.

21. The process as claimed in claim 14, wherein the (Mo, W)C base cermet is sintered at a temperature of at most 1450° C.

22. The process as claimed in claim 14, wherein the diamond powder contains a substance capable of forming carbides of (Mo, W)C or carbides containing molybdenum as a predominant component.

23. The process as claimed in claim 22, wherein the carbide-forming substance is at least one substance selected from the group consisting of molybdenum powder, molybdenum carbide powder and tungsten carbide powder.

24. The process as claimed in claim 22, wherein the carbide-forming substance is contained in a proportion of 1 to 30% by volume to the diamond powder.

25. The process as claimed in claim 22, wherein the diamond powder contains further an iron group metal selected from the group consisting of cobalt, nickel, iron and alloys thereof.

26. The process as claimed in claim 22, wherein a thin partition is provided at the boundary of the cermet part and diamond powder part.

27. The process as claimed in claim 26, wherein the thin partition consists of a high melting point material.

28. The process as claimed in claim 27, wherein the high melting point material is selected from the group consisting of titanium, zirconium, hafnium, tantalum, niobium, chromium, molybdenum, tungsten, platinum, titanium nitride, zirconium nitride and hafnium nitride.

29. The process as claimed in claim 27, wherein the thin partition has a thickness of at most 0.5 mm.

* * * * *